United States Patent [19]

Hinke et al.

[11] Patent Number: 5,454,150
[45] Date of Patent: Oct. 3, 1995

[54] MANUFACTURING METHODS FOR MACHINING SPRING ENDS PARALLEL AT LOADED LENGTH

[75] Inventors: Patrick T. Hinke, Burlington, Wis.; Dwayne M. Benson; Donald J. Atkins, both of Tempe, Ariz.

[73] Assignee: The United States of America as represented by the Administrator of the National Aeronautics and Space Administration, Washington, D.C.

[21] Appl. No.: 149,889

[22] Filed: Nov. 10, 1993

[51] Int. Cl.$^6$ .............................. B21F 35/00; B21F 3/00
[52] U.S. Cl. ....................... 29/173; 451/401; 267/166; 267/170
[58] Field of Search ...................... 451/48, 54, 55, 451/57, 58; 267/166, 170; 29/173, 446

[56] References Cited

U.S. PATENT DOCUMENTS

| 3,834,087 | 9/1974 | Dunn | 451/401 |
| 4,957,278 | 9/1990 | Komura et al. | 267/166 |

FOREIGN PATENT DOCUMENTS

| 0034537 | 2/1985 | Japan | 267/170 |

*Primary Examiner*—Bruce M. Kisliuk
*Assistant Examiner*—Derris H. Banks
*Attorney, Agent, or Firm*—Robert L. Broad, Jr.; Guy M. Miller; Alan J. Kennedy

[57] ABSTRACT

A first end surface of a coiled compression spring at its relaxed length is machined to a plane transverse to the spring axis. The spring is then placed in a press structure having first and second opposed planar support surfaces, with the machined spring end surface bearing against the first support surface, the unmachined spring end surface bearing against a planar first surface of a lateral force compensation member, and an opposite, generally spherically curved surface of the compensation member bearing against the second press structure support surface. The spring is then compressed generally to its loaded length, and a circumferentially spaced series of marks, lying in a plane parallel to the second press structure support surface, are formed on the spring coil on which the second spring end surface lies. The spring is then removed from the press structure, and the second spring end surface is machined to the mark plane. When the spring is subsequently compressed to its loaded length the precisely parallel relationship between the machined spring end surfaces substantially eliminates undesirable lateral deflection of the spring.

9 Claims, 1 Drawing Sheet

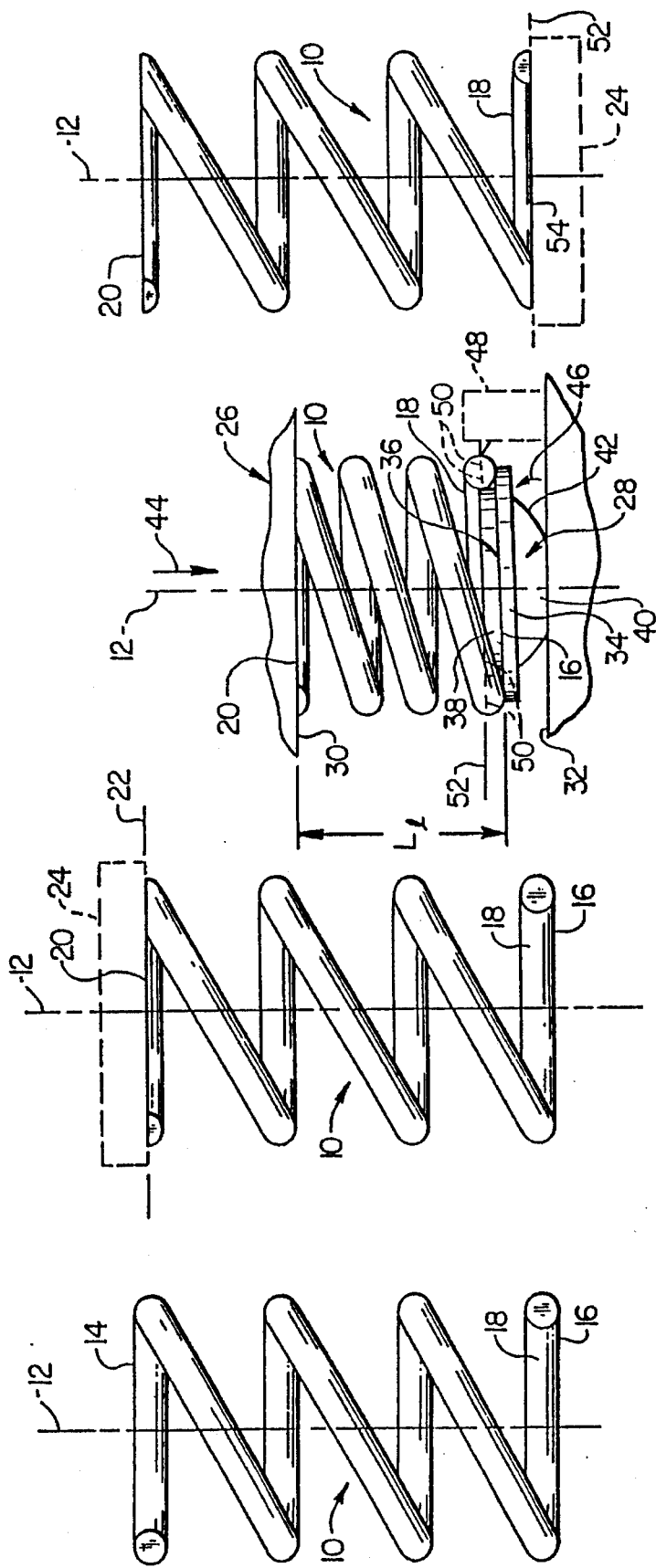

MANUFACTURING METHODS FOR MACHINING SPRING ENDS PARALLEL AT LOADED LENGTH

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention generally relates to the manufacture of springs, and, in a preferred embodiment thereof, more particularly relates to a method for machining the opposite end surfaces of a coiled compression spring in a manner such that the end surfaces will be precisely parallel to one another when the spring is axially compressed to a predetermined loaded length thereof.

2. Description of Related Art

Under conventional practice, the opposite end surfaces of a coiled compression spring are ground square, with the spring at its free or relaxed length, prior to placing the spring in an operating environment in which the spring is axially compressed to a working or loaded length between two opposing, parallel planar surfaces. This machining technique often results in spring end surfaces that are not precisely parallel to one another when the spring is ultimately compressed to its loaded length.

In turn, this nonparallel spring end surface relationship typically creates lateral deflection forces in the compressed spring which undesirably cause it to bend at least slightly to one side, thereby degrading the desired force/deflection linearity of the spring.

Traditional methods of compensating for this heretofore unavoidable lateral deflection of the compressed spring have been to react the lateral spring deflection force against a fixed object, or to add additional components to the overall spring installation that will not transmit the spring side load. The first compensation method undesirably adds friction to the assembled spring structure, while the second compensation method undesirably adds structural complexity to the overall spring assembly.

It can readily be seen from the foregoing that it would be desirable to provide an improved method for machining the opposite end surfaces of a coiled compression spring in a manner such that when the spring is compressed to its loaded length between a pair of opposing, parallel planar surfaces the machined spring end surfaces will be precisely parallel to one another to thereby essentially eliminate undesirable lateral deflection of the axially compressed spring. It is accordingly an object of the present invention to provide such a method.

SUMMARY OF THE INVENTION

In carrying out principles of the present invention, in accordance with a preferred embodiment thereof, a first end surface of a coiled compression is machined in a conventional manner, while the spring is at its relaxed length, to a plane transverse to the longitudinal axis of the spring. The partially machined spring, at its relaxed length, is then placed in a press structure having opposed, parallel planar first and second support surface areas that are selectively movable toward and away from one another, with the spring axis perpendicular to the first and second support surface areas; the machined end surface of the spring bearing against the first press structure support surface area; the unmachined spring end surface bearing against an essentially planar first side surface of a lateral force compensation member; and a generally spherically curved opposite side surface of the lateral force compensation member bearing against the second support surface area of the press structure.

The press structure is then used to axially compress the spring generally to its loaded length between the first support surface area of the press structure and the planar side surface of the lateral force compensation member. The typically nonparallel relationship between the machined and unmachined end surfaces of the compressed spring causes the lateral force compensation member to pivot around its spherically curved side surface, about an axis generally transverse to the longitudinal spring axis, in a manner dissipating side loading on the compressed spring to thereby maintain its length precisely perpendicular to the first and second press structure support surface areas.

With the spring axially compressed to its loaded length in this manner, a circumferentially spaced series of marks are appropriately formed on the outer side periphery of the spring coil on which the unmachined spring end surface lies, the series of marks lying in a plane parallel to the second support surface area of the press structure.

The marked spring is then removed from the press structure and returned to its relaxed length. Finally, with the removed spring at its relaxed length, the second spring end surface is machined to the plane of the marks thereon. Accordingly, when the machined spring is subsequently compressed to its loaded length between two opposing, parallel planar surface areas the machined opposite end surfaces of the compressed spring are precisely parallel to one another, thereby essentially eliminating lateral deflection forces on the spring and corresponding transverse bending thereof.

In a preferred embodiment thereof, the lateral force compensation member has a cylindrical boss portion centrally projecting from its planar side surface and removably insertable axially into the second spring end before the partially machined spring is initially inserted into the press structure. The inserted boss portion captively retains the lateral force compensation member on the second spring end during compression of the spring by the press structure.

BRIEF DESCRIPTION OF THE DRAWINGS

FIGS. 1A–1D are side elevational views of a coiled compression spring and sequentially depict, in schematic form, a method of the present invention used to machine the opposite end surfaces of the spring in a manner such that when the machined spring is subsequently axially compressed from its relaxed length to a shortened loaded length between two parallel, planar surfaces the machined ends of the compressed spring will be precisely parallel to one another, thereby at least substantially reducing undesirable lateral deflection forces in the compressed spring.

DETAILED DESCRIPTION

Illustrated in FIG. 1A at its free or relaxed length is a representative coiled compression spring 10 that extends along a longitudinal spring axis 12 and has in initially unmachined upper end surface 14, and an initially unmachined lower end surface 16 at the bottom side of the lowermost coil 18 of the spring.

The present invention provides a unique method for machining the top and bottom spring end surfaces 14,16 in a manner such that when the machined spring is axially compressed to a predetermined shortened loaded length thereof between a pair of opposing, parallel planar surfaces the opposite end surfaces of the compressed spring are precisely parallel to one another. This precisely parallel relationship between the machined opposite spring end surfaces substantially eliminates lateral deflection forces in the compressed spring and resulting undesirable transverse bending thereof.

Referring now to FIG. 1B, the first step in the machining method of the present invention is carried out with the spring 10 suitably supported at its relaxed length and entails the machining of the upper spring end surface 14 down to a machined upper end surface 20 lying in a plane 22 transverse to the spring axis 12 using a conventional, schematically depicted grinding tool 24.

To carry out the next step of the method, shown in FIG. 1C, a suitable press structure 26 and a specially designed lateral force compensation member 28 are provided. Press structure 26 has opposing, parallel, essentially planar top and bottom support surface areas 30,32 that may be selectively moved toward and away from one another. The lateral force compensation member 28 has a disc-shaped body portion 34 with an essentially planar top side surface 36; a central cylindrical boss portion 38 projecting upwardly from the top side surface 36; and a domed central bottom portion 40 projecting downwardly from the bottom side of body portion 34 and having a spherically curved outer side surface 42.

For purposes later described, the boss portion 40 is removably and complementarily insertable axially into the bottom end of the spring 10 to bring the unmachined bottom spring end surface into abutment with the upper side surface 36 of the body portion 34 around the boss portion 38.

Still referring to FIG. 1C, after the upper spring end surface is machined as shown in FIG. 1B, the boss portion 38 of the lateral force compensation member 28 is operatively inserted into the bottom end of the spring to bring the unmachined lower end surface 16 of the spring into abutment with the top side surface 36 of the body portion 34 of the lateral force compensation member 28. Next, with the spring 10 generally at its relaxed length, the spring and the inserted member 28 are positioned within the press structure with the machined top spring end surface 20 bearing against the upper press structure support surface 30; the spring axis 12 transverse to the press structure support surfaces 30 and 32; the unmachined lower spring end surface 16 bearing against the top side surface 36 of the lateral force compensation member body portion 34; and the spherically curved bottom surface 42 of the lateral force compensation member bearing against the lower press structure support surface 32.

The press structure 26 is then operated to forcibly move its upper support surface 30 toward its lower support surface 32, as indicated by the arrow 44 in FIG. 1C, to compress the spring 10 generally to its loaded length $L_1$ between the upper press structure support surface 30 and the upper side surface 36 of the lateral force compensation member 28.

With the spring 10 compressed in this manner, generally to its loaded length $L_1$, the typically nonparallel relationship between the machined upper spring end surface 20 and the unmachined lower spring end surface 16 causes the lateral force compensation member 28 to tip slightly (as indicated by the arrow 46 in FIG. 1C), along its spherically curved bottom side surface 42 around an axis transverse to the longitudinal axis 12 of the compressed spring 10. For example, if the left side of the lower spring end surface 16 is lower than its right side as viewed in FIG. 1C, the lateral force compensation member 28 will be tipped in a counterclockwise direction as indicated.

Importantly, the tipping of the lateral force compensation member 28 caused by the nonparallel relationship of the end surfaces 16,20 in the compressed spring 10 relieves the lateral deflection forces in the spring (which would otherwise be created in the compressed spring and cause it to transversely bend) and maintains the length of the compressed spring precisely transverse to the press structure support surfaces 30 and 32.

Next, a schematically depicted scribing tool 48 (or other suitable marking tool) is used to form a circumferentially spaced series of marks 50 on the radially outer periphery of the bottom coil 18 of the compressed spring 10 as shown in FIG. 1C, the marks 50 lying in a plane 52 parallel to the lower press structure support surface 32. The press structure 26 is then opened, the spring 10 is removed from the press structure, and the lateral force compensation member 28 is removed from the bottom spring end.

Finally, as shown in FIG. 1D, the removed spring 10 (at its relaxed length) is suitably supported while its lower end surface is machined, using the conventional grinding tool 24, down to a machined planar end surface 54 lying in the plane 52 defined by the peripheral marks 50 on the bottom end coil 18 of the spring.

Using the machining method just described, when the spring 10 is later axially compressed to its loaded length between two opposing, parallel planar surfaces the built-in precise parallel relationship between the machined spring end surfaces 20,54 occurring when the spring is brought to its loaded length essentially eliminates lateral deflection forces, and corresponding transverse bending, in the operatively compressed spring.

The foregoing detailed description is to be clearly understood as being given by way of illustration and example only, the spirit and scope of the present invention being limited solely by the appended claims.

What is claimed is:

1. A method of machining the first and second opposite end surfaces of a coiled compression spring in a manner such that when the spring is axially compressed from a relaxed length thereof to a shortened loaded length thereof between a pair of parallel, opposing planar surfaces the machined first and second end surfaces of the compressed spring will be precisely parallel to one another to thereby at least substantially reduce lateral deflection forces in the compressed spring, said method comprising the steps of:

machining said first end surface of the spring to a plane transverse to the longitudinal axis of the spring while the spring is at said relaxed length thereof;

axially compressing the spring generally to its loaded length, by exerting axially inwardly directed forces on the machined first spring end surface and the unmachined second spring end surface, in a manner essentially eliminating laterally outwardly directed forces in the compressed spring due to a nonparallel relationship between its first and second end surfaces;

forming a circumferentially spaced series of marks on the coil of the compressed spring upon which said second end surface lies, said series of marks being disposed within a plane parallel to the plane of the machined first spring end surface;

returning the marked spring to its relaxed length; and machining the second end surface of the spring to the plane in which said circumferentially spaced series of marks lie.

2. A method of machining the first and second opposite end surfaces of a coiled compression spring in a manner such that when the spring is axially compressed from a relaxed length thereof to a shortened loaded length thereof between a pair of parallel, opposing planar surfaces the machined first and second end surfaces of the compressed spring will be precisely parallel to one another to thereby at least substantially reduce lateral deflection forces in the compressed spring, said method comprising the steps of:

machining said first end surface of the spring to a plane transverse to the spring axis;

exerting axially inwardly directed forces on the machined first spring end surface and the unmachined second spring end surface, in a manner compressing the spring generally to said loaded length thereof, while permitting the second spring end to pivot, about an axis generally transverse to the longitudinal axis of the spring, in response to an outwardly directed lateral load created in the spring by its axial compression;

forming a circumferentially spaced series of marks on the coil of the compressed spring upon which said second end surface lies, said series of marks being disposed within a plane parallel to the plane of the machined first spring end surface; and machining the second end surface of the spring to the plane in which said circumferentially spaced series of marks lie.

3. The method of claim 2 wherein:

said step of machining said first end surface of said spring is performed while said spring is at said relaxed length thereof.

4. The method of claim 2 wherein:

said step of machining the second end surface of the spring is performed with said spring at said relaxed length thereof.

5. A method of machining the first and second opposite end surfaces of a coiled compression spring in a manner such that when the spring is axially compressed from a relaxed length thereof to a shortened loaded length thereof between a pair of parallel, opposing planar surfaces the machined first and second end surfaces of the compressed spring will be precisely parallel to one another to thereby at least substantially reduce lateral deflection forces in the compressed spring, said method comprising the steps of:

machining said first end surface of the spring to a plane transverse to the spring axis while the spring is at said relaxed length thereof;

providing a press structure having first and second generally planar opposing support surface areas selectively movable toward and away from one another;

providing a lateral force compensation member having a generally planar surface on one side thereof and a generally spherically curved surface on an opposite side thereof;

positioning the spring within said press structure with the spring generally at said relaxed length thereof, the spring axis transverse to said first and second press structure support surface areas, the machined first end surface of the spring engaging said first press structure support surface area, the unmachined second end surface of the spring engaging said generally planar surface of said lateral force compensation member, and said generally spherically curved surface of said lateral force compensation member engaging said second press structure support surface area;

moving said first and second press structure support surface areas toward one another in a manner axially compressing the spring, generally to said loaded length thereof, between said first press structure support surface area and said generally planar surface of said lateral force compensation member;

forming a circumferentially spaced series of marks of the coil of the compressed spring upon which said second end surface of the spring lies, said marks being disposed within a plane parallel to said second press structure support surface area;

removing the marked spring from said press structure; and machining the second end surface of the removed spring to the plane in which said circumferentially spaced series of marks lie.

6. The method of claim 5 wherein:

said step of machining the second end surface of the removed spring is performed while the removed spring is generally at said relaxed length thereof.

7. The method of claim 5 wherein:

said lateral force compensation member has a central cylindrical boss portion projecting axially outwardly from said generally planar surface of said lateral force compensation member, and said positioning step includes the step of inserting said central cylindrical boss portion into the second end of the spring.

8. A method of machining the first and second opposite end surfaces of a coiled compression spring in a manner such that when the spring is axially compressed from a relaxed length thereof to a shortened loaded length thereof between a pair of parallel, opposing planar surfaces the machined first and second end surfaces of the compressed spring will be precisely parallel to one another to thereby at least substantially reduce lateral deflection forces in the compressed spring, said method comprising the steps of:

machining said first end surface of the spring to a plane transverse to the spring axis while the spring is at said relaxed length thereof;

providing a press structure having first and second generally planar opposing support surface areas selectively movable toward and away from one another;

providing a lateral force compensation member having a generally planar surface on one side thereof, a generally spherically curved surface on an opposite side thereof, and a central cylindrical boss portion projecting axially outwardly from said generally planar surface of said lateral force compensation member, said boss portion being axially insertable into the second spring end to bring said generally planar surface of said lateral force compensation member into engagement with said second end surface of said spring;

inserting said central boss portion of said lateral force compensation member into the second spring end;

positioning the spring and the inserted lateral force compensation member within said press structure with the spring generally at said relaxed length thereof, the spring axis transverse to said first and second press structure support surface areas, the machined first end surface of the spring engaging said first press structure support surface area, the unmachined second end surface of the spring engaging said generally planar surface of said lateral force compensation member, and said generally spherically curved surface of said lateral force compensation member engaging said second press structure support surface area;

moving said first and second press structure support surface areas toward one another in a manner axially compressing the spring, generally to said loaded length thereof, between said first press structure surface area and said generally planar surface of said lateral force compensating member;

forming a circumferentially spaced series of marks on the coil of the compressed spring upon which said second end surface of the spring lies, said marks being disposed within a plane parallel to said second press structure support surface area;

removing the marked spring from said press structure;

removing said boss portion of said lateral force compensation member from the second spring end; and machining the second end surface of the removed spring to the plane in which said circumferentially spaced series of marks lie.

9. The method of claim 8 wherein:

said step of machining the second end surface of the removed spring is performed while the removed spring is generally at said relaxed length thereof.

* * * * *